United States Patent [19]

Williams et al.

[11] Patent Number: 4,485,122
[45] Date of Patent: Nov. 27, 1984

[54] METHOD OF AN ARRANGEMENT FOR COATING OPTICAL FIBERS WITH METALLIC MATERIALS

[75] Inventors: Joseph C. Williams, Buchanan, Va.; Jeff P. Garmon, Rome, Ga.; Dipak R. Biswas, Roanoke, Va.; Dilip K. Nath, Framingham, Mass.

[73] Assignee: International Telephone and Telegraph Corporation, New York, N.Y.

[21] Appl. No.: 477,995

[22] Filed: Mar. 23, 1983

[51] Int. Cl.³ .............................................. B05D 5/06
[52] U.S. Cl. .................................... 427/45.1; 427/55; 427/163
[58] Field of Search ......................... 427/54.1, 55, 163

[56] References Cited

U.S. PATENT DOCUMENTS 4,306,897 12/1981 Maklad .......................... 427/163 X Primary Examiner—Shrive P. Beck
Attorney, Agent, or Firm—John T. O'Halloran; Peter R. Ruzek

[57] ABSTRACT

A metallic material coating is applied to the external surface of a freshly drawn optical fiber while such surface is still pristine by passing the optical fiber through a body of liquid metal-organic material which forms a layer on the fiber, and by subsequently removing all non-metallic components from the layer of metal-organic material by volatilizing the same. The optical fiber with the layer metal-organic material is passed through a baking oven in which at least the layer is heated to a baking temperature at which organic materials present in the metal-organic material are volatilized and the remainder is baked to the fiber. Then, at least the layer is fired in a firing chamber at a higher temperature at which the metal-organic material is decomposed into its volatile non-metallic and non-volatile metallic components, the latter remaining in the layer and the former becoming volatile and leaving the layer. Preferably, at least one layer of synthetic plastic material is applied over the thus obtained metallic layer. When the firing is done in an inert or reducing atomsphere, the metallic material is in its elemental form, while it is in its metal-oxide form when the firing operation is accomplished in an oxidizing atmosphere. Various printing inks and/or resinates may be used as the starting metal-organic materials in the process according to the invention.

13 Claims, 2 Drawing Figures

METHOD OF AN ARRANGEMENT FOR COATING OPTICAL FIBERS WITH METALLIC MATERIALS

BACKGROUND OF THE INVENTION

The present invention relates to coating of optical fibers in general, and more particularly to a method of an arrangement for coating optical fibers with metallic materials, especially immediately after the fiber is drawn from an optical preform.

In the manufacture of optical fibers, especially such to be used in the telecommunication field, it is often necessary to provide the optical fiber with a metallic coating, especially hermetic metallic coating, at its outer surface, if for no other reason, then to protect the fiber from deleterious environmental influences which could damage the mechanical and optical properties of the optical fiber.

Having recognized this need for providing metallic coating on the external surface of the optical fiber, there have been already proposed, and the optical fiber manufacturing industry uses, various methods of applying the desired metallic coatings to the optical fiber. Probably the most widely currently used method of coating glass fibers with metals, such as aluminum or indium, is by molten metal-dip coating. In such a coating method, the metal to be applied is molten in a coating cup and the fiber is passed through the molten metal accommodated in the coating cup. While most of the work involving molten metal-dipped coating was done with aluminum and indium, other metals, such as antimony, zinc and Al-Si were also tried.

However, experience has shown that several serious problems are associated with this process. Such problems include, among others, initial strength degradation due to fiber surface damage from abrasive oxides formed in the molten metal, development of pinholes in the applied metallic coating layer, and microbending losses due to the presence of a thick, non-uniform coating. Another disadvantage of this method is that it is limited to metals and alloys having relatively low melting temperatures, so that the optical fiber manufactured by using this method can not be used in relatively high temperature environments.

SUMMARY OF THE INVENTION

Accordingly, it is a general object of the present invention to avoid the disadvantages of the prior art.

More particularly, it is an object of the invention to provide a method of coating optical fibers with metallic materials, which method does not possess the disadvantages of the conventional coating methods.

Still another object of the present invention is to develop a method of applying metallic material coating layers to optical fibers, which does not require the application of the metallic materials in the molten state and which significantly expands the range of metallic materials which can be applied to the optical fiber.

A concomitant object of the present invention is to devise an arrangement which is particularly suited for performing the method of the present invention.

It is yet another object of the present invention to so construct the coating arrangement as to be simple in construction, inexpensive to manufacture, easy to use, and reliable nevertheless.

In pursuance of these objects and others which will become apparent hereafter, one feature of the present invention resides in a method of coating optical fibers, comprising the steps of contacting the respective optical fiber with a metal-organic material capable of adhering to the optical fiber to form on the latter a continuous layer of such material; and converting the metal-organic material into volatile non-metallic, and non-volatile metallic, components respectively leaving the continuous layer, and remaining therein in the form of a metallic material. It is particularly advantageous when the contacting step is performed immediately after drawing of the optical fiber from a preform, especially since the outer surface of the optical fiber is still pristine at this time. The contacting step advantageously includes passing the respective fiber through a body of the metal-organic material, which is advantageously in its liquid state substantially at the room temperature. A particular advantage of this method is that, since the metallic material is not applied to the optical fiber in its final form, which would require the application of this metallic material at a temperature above the melting point of the respective metallic material, but rather it is applied through the intermediary of the metal-organic compound, which is flowable in its liquid state at temperatures significantly lower than the melting temperature of the respective metallic material, the material of the optical fiber will not be unduly heated during the performance of the coating process.

It is especially advantageous when the metal-organic material is a mixture of at least one decomposable metal-organic compound and at least one volatilizable non-metallic compound such as, a solvent for the decomposable metal-organic compound. In this case, it is advantageous when the converting step is performed in two stages, the first stage including pre-heating at least the layer of the metal-organic material at least to the volatilization temperature of the volatilizable non-metallic compound, and the second stage including heating at least the layer of the remaining decomposable metal-organic compound at least to the decomposition temperature of the metal-organic compound to decompose the latter into its aforementioned components. Even though heat is supplied to the coating layer and, via the same, to the underlying optical fiber, during these two stages, there is no adverse affect on the quality of the optical fiber, especially since the temperature of the optical fiber does not rise to the level it would rise to were the respective metallic material applied in its molten state.

When the converting step is performed in an inert or reducing atmosphere, the metallic material remaining in the continuous layer on the optical fiber is substantially in its elemental metal form, whereas the metallic material is in its oxide form when the converting step is conducted in an oxidizing atmosphere.

After the metallic material layer has been formed in the above-discussed manner on the outer surface of the optical fiber, at least one layer of an external coating of a synthetic plastic material, especially a polymer, can be applied over the same to provide additional protection, especially against mechanical damage.

The arrangement for performing the above method includes means for contacting the respective optical fiber with a metal-organic material capable of adhering to the optical fiber to form on the latter a continuous layer of such material, such contacting means preferably including a container, a body of the metal-organic material accommodated in the container, and means for passing the optical fiber through the body, preferably in the longitudinal direction of the optical fiber along a substantially vertical path, advantageously in the downward direction, the container being arranged along the path and having a bottom wall provided with an aperture through which the optical fiber passes with minimum clearance between the interior and the exterior of the container. This assures the application of the metal-organic material to the external surface of the fiber in a uniform layer of the desired thickness which substantially corresponds to the size of the clearance. The arrangement of the present invention further includes means for converting the metal-organic material into volatile non-metallic, and non-volatile metallic, components respectively leaving, and remaining in, the continuous layer. Such converting means advantageously includes means for heating at least the layer of the metal-organic material at least to a volatilization temperature of the non-metallic component, or to a decomposition temperature of the metal-organic material at which the non-metallic component becomes volatile. It is particularly advantageous when the metal-organic material of the body includes at least one decomposable metal-organic compound and, mixed therewith, at least one volatilizable non-metallic compound, such as a solvent for the decomposable metal-organic compound. Under these circumstances, it is advantageous when the converting means includes a baking oven operative for pre-heating at least the layer of the metal-organic material at least to the volatilization temperature of the volatilizable non-metallic compound, and a firing chamber arranged downstream of the baking oven and operative for heating at least the layer of the remaining decomposable metal-organic compound at least to the decomposition temperature of the decomposable metal-organic compound to decompose the latter into said components thereof. The arrangement may further include, to advantage, means for applying at least one protective layer of synthetic plastic material, such as a polymer, over the continuous layer downstream of the converting means.

BRIEF DESCRIPTION OF THE DRAWING

Above-mentioned and other features and objects of the invention will become more apparent by reference to the following description taken in conjunction with the accompanying drawing, in which.

DETAILED DESCRIPTION OF THE PREFERRED EMBODIMENT

Figure 1:
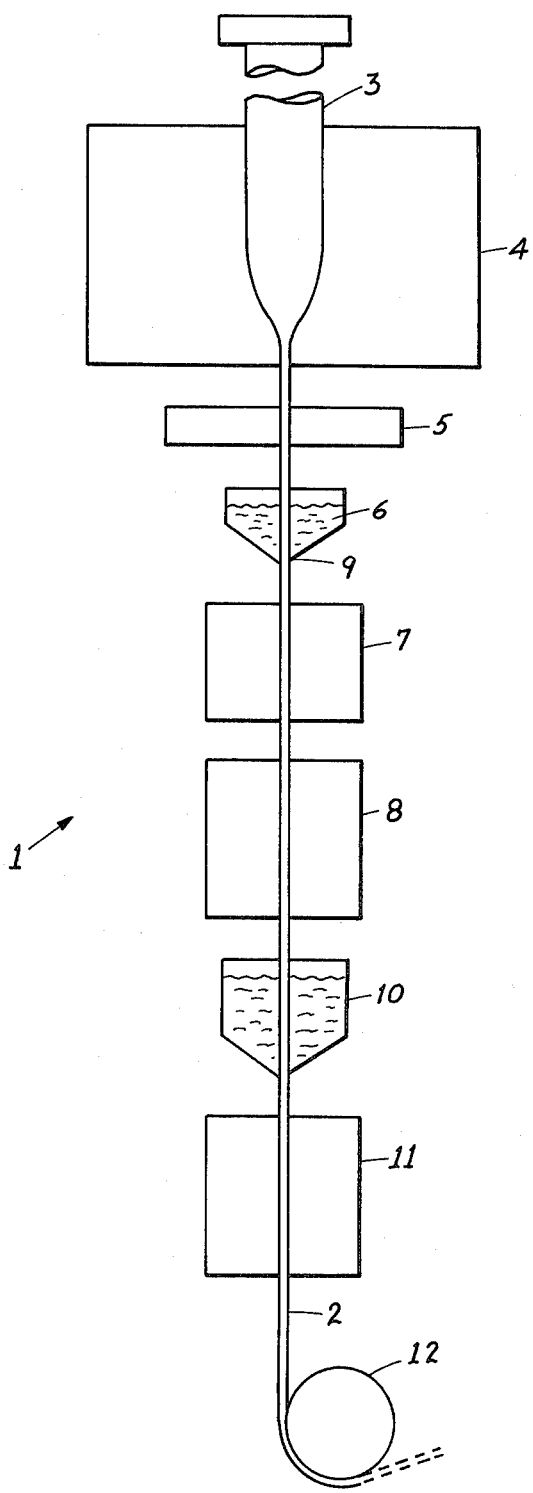
FIG. 1 is a diagrammatic side elevational view of an optical fiber drawing apparatus with the coating arrangement according to the present invention.

Referring now to the drawing in detail, and first to FIG. 1 thereof, it may be seen that the reference numeral 1 has been used to identify an optical fiber drawing apparatus, which is equipped with a coating arrangement according to the present invention, in its entirety. The optical fiber drawing apparatus 1 is constructed to draw an optical fiber from an optical preform 3, in a manner which is fully conventional and will not be discussed here in any detail. Suffice it to say that the optical preform 3 is accommodated in or extends into a draw furnace 4 where it is heated to a temperature at which the optical fiber 2 can be drawn therefrom. To assure uniformity of the optical fiber 2 drawn from the optical preform 3, the apparatus 1 is equipped, again in a conventional manner, with a fiber diameter control 5 arranged downstream of the draw furnace 4 and operative for issuing feedback signals which are used to control the fiber drawing operation, for instance, by controlling the rate at which the optical preform 3 is lowered into the draw furnace 4.

As mentioned before, the apparatus 1 is equipped with an arrangement for coating the optical fiber 2 which metallic material. This coating arrangement includes an applicator or cup 6, a baking oven 7, and a firing chamber 8, which are arranged in downstream succession from one another and downstream from the fiber diameter control 5, and at such a distance from the draw furnace 4 that the exposed surface of the fiber 2 is still pristine, that is, its quality has not yet been materially degraded by environmental influences, such as by atmospheric attack, by the time it reaches the applicator 6.

The applicator 6 is constructed as a vessel or cup containing a body or bath of metal-organic substance, of which several examples will be given later. In the illustrated construction of the apparatus 1, the applicator 6 has an aperture 9 in its bottom for the passage of the optical fiber 2 therethrough in the downward direction. As the optical fiber 2 advances through the bath contained in the applicator 6, the metal-organic material of the bath, which is in its liquid state, will come into contact with and adhere to the external surface of the optical fiber 2. During the passage of the optical fiber 2 through the aperture 9, a small clearance results between the optical fiber 2 and the surface bounding the aperture 9, the size of this clearance determining the thickness of the layer of metal-organic material which will be present on the optical fiber 2 after emerging from the aperture 9. Thus, the region of the applicator 6 which bounds the aperture 9 acts as a stripper of excessive metal-organic material from the optical fiber 2. The metal-organic material contained in the applicator 6 is a metal-substituted polymer or resinate which is in its liquid state substantially at room temperature. Various printing inks fall into this category, and they may be advantageously used in the practice of the present invention. The metal-organic material or substance may itself have a sufficiently low viscosity and/or adherence to the optical fiber 2 to form a continuous layer of substantially uniform thickness on the fiber 2 during its passage through the aperture 9. However, should this not be the case, the metal-organic material may be diluted by a solvent or a similar liquid vehicle which would achieve the desired results. The only requirements which such liquid vehicle would have to satisfy are that it keep the metal-organic material in solution or suspension of uniform concentration of the metal-organic material, and that it be volatilizable at relatively low temperatures. On the other hand, the metal-organic material, in order to be suitable for use in the practice of the present invention, would have to be decomposable into volatile non-metallic, and non-volatile metallic, components at a temperature significantly below the melting point of the metallic material with which the optical fiber 2 is to be coated.

After emerging from the aperture 9 of the applicator 6, the optical fiber 2 with the layer of the metal-organic material thereon enters the baking oven 7 and passes therethrough. A temperature between about 100° and 300° C. is being maintained in the interior of the baking oven 7. Thus, as the optical fiber 2 carrying the metal-organic material thereon passes through the interior of the baking oven 7, any components of the layer adhering to the optical fiber 2, the volatilization temperature of which is below the aforementioned temperature range within the baking oven 7, will be volatilized and thus will leave the layer. Simultaneously therewith, the non-volatilizable component of the layer which still remains on the optical fiber 2 is baked to the optical fiber 2 in a manner preventing this remainder from disassociating itself from the optical fiber 2 or from falling apart. On the other hand, the temperature in the baking oven 7 is not high enough to decompose the material remaining on the optical fiber 2 into its constituent components. Thus, the optical fiber 2 will emerge from the baking oven 7 with a layer of metal-organic material which is substantially devoid of any non-metallic components which are volatilizable at temperatures within the above-mentioned temperature range.

On emerging from the baking oven 7, the optical fiber with the aforementioned baked layer of the metal-organic material thereon will enter into an pass through the firing chamber 8. The temperature prevailing in the firing chamber 8 is in the range approximately between 350° and 1000° C. In this temperature range, not only will any residual volatilizable components remaining in the baked layer be volatilized and hence expelled from the layer, but also the metal-organic compound itself will be decomposed into its volatile non-metallic, and non-volatile metallic, components, and the volatile component or components will leave the layer, leaving only the metallic component behind. Depending on the environment or atmosphere in which the firing operation is performed, the metallic component or material remaining on the optical fiber 2 at the conclusion of the firing operation will be either in its elemental form, provided that the firing operation is conducted in an inert or reducing atmosphere, or in its metal oxide form when the firing operation is conducted in an oxidizing atmosphere. The layer of the metallic material leaving the firing chamber 8 with the optical fiber 2 will adhere to the latter and will have uniform thickness throughout without any interruptions or inclusions or residues from the materials which have been present on the fiber 2 during the preceding operations. The continuity and uniformity of the coating of the metallic material on the fiber 2 as it emerges from the firing chamber 8 is believed to be attributable to the fact that the fiber 2 itself or the coating layer thereon does not come into contact with any solid parts which could abrade or interrupt the layer, especially due to the absence of abrasive metal oxide particles from the liquid body contained in the applicator 6.

In many instances, it is desired to provide the optical fiber with an external layer of polymer or synthetic plastic material covering the metallic layer previously deposited on the optical fiber 2. To this end, the apparatus 1 is further equipped with a dip coater 10 of a construction similar to that of the applicator 6, which is arranged downstream of the firing chamber 8. The dip coater 10 contains a bath of liquid polymer or synthetic plastic material so that, as the optical fiber 2 passes in the downward direction through this polymer body, the polymer will form a layer on the coated optical fiber 2, basically in accordance with the same mechanism as described above in connection with the operation of the applicator 6. Then, the optical fiber 2 with the layer of the yet uncured polymer thereon will pass through a polymer curing chamber 11 in which the polymer material of the external layer is cured to obtain the required properties, such as flexibility, abrasion resistance, and the like. Depending on the character of the synthetic plastic material forming the external layer, the curing process may involve heating at least the external layer to a curing temperature of the synthetic plastic material when this material is heat-curable, or directing radiation, such as ultra-violet radiation, against the external layer when the material thereof is curable by exposure to such radiation.

Figure 2:
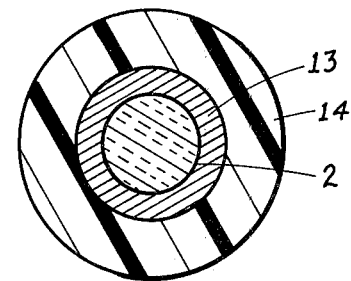
FIG. 2 is a substantially enlarged cross-sectional view of an optical fiber coated in accordance with the present invention.

Finally, after emerging from the curing chamber 11, the optical fiber 2 provided with the metallic coating layer and with the external synthetic plastic material layer reaches a disc shaped or roller shaped element 12 which may be a reel or spool on which the optical fiber is being wound, or a capstan around which the optical fiber 2 is trained to proceed therefrom to a different location, as indicated in broken lines in FIG. 2. The dip coater 10, the curing chamber 11 and the element 12 are standard components used in the optical fiber manufacturing industry whenever synthetic plastic material coated optical fiber is to be manufactured, so that they need not be discussed here in any greater detail than already done.

A cross-sectional view of the optical fiber manufactured in accordance with the method of the present invention, such as in the apparatus 1 described above, is shown in FIG. 2. It may be seen that the optical fiber 2 proper, which is shown to be of glass material or a similar vitreous optical material, is immediately surrounded by a continuous layer 13 of a metallic material, the layer 13 having a uniform thickness all around the optical fiber 2. A layer 14, also having a uniform thickness and consisting of synthetic plastic material, surrounds the metallic layer 13. As discussed above, the layer 13 is the result of the passage of the optical fiber 2 through the applicator 6, the baking oven 7 and the firing chamber 8, while the layer 14 was obtained during the passage of the optical fiber 2 with the layer 13 previously provided thereon through the dip coater 10 and the curing chamber 11 of the apparatus 1.

While the coating process according to the present invention has been discussed above as being performed in a continuous operation in the apparatus 1, in actual practice it will often be preferred to perform this process in several stages. The reason for this is that it is usually preferable to perform the various process steps at different speeds of advancement of the optical fiber 2, especially since the equipment used for the performance of the various steps would otherwise be too bulky. When the operation is performed in several stages, separated by storage of the fiber 2 on takeup reels or drums, it is possible to design the equipment in an optimum manner for achieving the particular stage of the operation without regards to the designs of the other components of the apparatus 1 and the speed of advancement of the optical fiber 2 through or the required dwell time of the optical fiber 2 in such other components.

It is currently preferred for the metal-organic dip coating material to be a solution of metal-organic resinate or ink. Such material is a reaction product of any of several organic compounds with metal salts. It is usually a long-chain metal-substituted molecule, where a wide variety of different metals may be used as a substituents. The metal-organic material usually has a very rapid drying rate and always adheres to the optical fiber 2, being adhesively connected thereto even after the evaporation of the solvent which, in some instances, may evaporate even before the fiber 2 reaches the baking oven 7. In the baking oven 7 the solvent, or the remainder of the solvent, is evaporated from the layer of metal-organic material and the latter is baked to rigidly adhere to the fiber 2. Any organic materials remaining in the metal-organic layer are completely removed when the fiber 2 passes through the firing chamber 8. The time required for the performance of the firing operation may vary from a few seconds up to a minute or two, depending on the metal-organic material being used and the firing temperature. Of course, the length of the path traversed by the optical fiber 2 as it passes through the firing chamber 8 and the speed of advancement of the optical fiber 2 through the firing chamber 8 determine the dimensions of the firing chamber 8.

The following table contains only a few examples of metal-oxide coating materials which can be provided on the optical fiber 2 in accordance with the method of the present invention:

| Reacting Conditions of Metal-Organic Coating Materials | | | |
|---|---|---|---|
| Coating Material | Metal-Organic Material | Firing Temperature (°C.) | Environment |
| Ag - Pt | Silver Platinum ink | 350 | inert/$H_2$ |
| Al | Aluminum Ink | 350–650 | inert/$H_2$ |
| $Al_2O_3$ | Aluminum Ink | 350–1000 | oxygen |
| Bi | Bismuth Resinate | 350–650 | inert/$H_2$ |
| Cr | Chromium Resinate | 350–800 | inert/$H_2$ |
| Ni | Nickel Resinate | 350–800 | inert/$H_2$ |
| Si | Silicon Resinate | 350–800 | inert/$H_2$ |
| $SnO_2$ | Tin Resinate | 350–800 | oxygen |
| $TiO_2$ | Titanium Resinate | 350–1000 | oxygen |

Obviously, if it is desired to apply a coating layer of a different metallic material, different metal-organic material will be used as the starting material, and the firing temperature and the environment will be adjusted to take into account this different metal-organic material.

It is currently preferred to perform the coating process in accordance with the present invention in the following three stages:

Stage 1

The optical fiber 2 is drawn at a speed of 30–50 m/min. A thin resinate/ink layer is applied to the optical fiber 2 as it passes through the applicator 6. This layer is baked at a temperature between 100° and 300° C. as it passes through the baking oven 7 immediately or shortly after emerging from the applicator 6, at the above-mentioned drawing speed. The optical fiber 2 with the baked layer thereon is stored on a takeup spool.

Stage 2

The optical fiber 2 with the baked layer thereon is payed out from the takeup spool and advanced through the firing chamber 8 at a speed which may differ from the aforementioned drawing speed and usually will be lower than the drawing speed to render if possible to keep the dimensions of the firing chamber 8 to a minimum. The temperature in the firing chamber 8 is between 350° and 1000° C. Then, a thin polymer coating, with a thickness of between 5 to 10 μ, is applied over the previously formed layer 17 and is cured. The resulting coated fiber 2 is wound up on a takeup spool.

Stage 3

A thick polymer coating having a thickness of 0.2 to 1 mm is applied to the product obtained in Stage 2 after the same has been payed up from the takeup spool. This coating operation is performed at a higher speed, such as at 60–100 m/min.

It has been found that by using metal-organic resinate/ink, there are obtained excellent adherence of the metal layer to the fiber 2, and the metal layer 13 is uniform and free from defects, having a thickness, for instance, between 200 and 2000 Å.

While we have described above the principles of our invention in connection with specific apparatus, it is to be clearly understood that this description is made only by way of example and not as a limitation to the scope of our invention as set forth in the accompanying claims.

We claim:

1. A method of coating optical fibers, comprising the steps of
   contacting the respective optical fiber with a metal-organic material capable of adhering to the optical fiber to form on the latter a continuous layer of such material; and
   converting the metal-organic material into volatile non-metallic, and non-volatile metallic, components respectively leaving the continuous layer, and remaining therein in the form of a metallic material.

2. The method as defined in claim 1, wherein said contacting step is performed immediately after drawing of the optical fiber from a preform while the outer surface of the optical fiber is still pristine.

3. The method as defined in claim 1, wherein said contacting step includes passing the respective fiber through a body containing the metal-organic material.

4. The method as defined in claim 3, wherein the metal-organic material contained in the body is in its liquid state.

5. The method as defined in claim 1, wherein said converting step includes heating at least the layer of the metal-organic material at least to a volatilization temperature of the non-metallic component.

6. The method as defined in claim 1, wherein said converting step includes heating at least the layer of the metal-organic material at least to a decomposition temperature of the metal-organic material at which the non-metallic component become volatile.

7. The method as defined in claim 1 for use with a metal-organic material including at least one volatilizable non-metallic compound and at least one decomposable metal-organic compound mixed with one another, wherein said converting step includes pre-heating at least the layer of the metal-organic material at least to the volatilization temperature of the volitilizable non-metallic compound, and subsequently heating at least the layer of the remaining decomposable metal-organic compound at least to the decomposition temperature of the metal-organic compound to decompose the latter into its aforementioned components.

8. The method as defined in claim 1, and further comprising the step of applying at least one protective layer over said continuous layer following said converting step.

9. The method as defined in claim 8, wherein said applying step includes covering said continuous layer with a curable synthetic plastic material, and curing the synthetic plastic material.

10. The method as defined in claim 9, wherein said curing includes heating the protective layer to a curing temperature of the synthetic plastic material.

11. The method as defined in claim 9, wherein said curing includes directing radiation against the protective layer.

12. The method as defined in claim 1, wherein said converting step is performed in an inert to reducing environment to obtain the metallic material substantially in its elemental metal form.

13. The method as defined in claim 1, wherein said converting step is performed in an oxidizing environment to obtain the metallic material substantially in its metal oxide form.

* * * * *